United States Patent
Srivastava

(10) Patent No.: US 6,484,123 B2
(45) Date of Patent: Nov. 19, 2002

(54) METHOD AND SYSTEM TO IDENTIFY WHICH PREDICTORS ARE IMPORTANT FOR MAKING A FORECAST WITH A COLLABORATIVE FILTER

(75) Inventor: Ashok N. Srivastava, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 09/726,735

(22) Filed: Nov. 30, 2000

(65) Prior Publication Data

US 2002/0099519 A1 Jul. 25, 2002

(51) Int. Cl.$^7$ .............................................. G06F 101/14
(52) U.S. Cl. ....................................... 702/181; 702/127
(58) Field of Search ........................ 717/121; 382/225; 706/15; 600/300; 702/181

(56) References Cited

U.S. PATENT DOCUMENTS 5,485,621 A * 1/1996 Schwanke et al. ........... 717/121
6,304,675 B1 * 10/2001 Osbourn et al. ............. 382/225

OTHER PUBLICATIONS

"IBM DB2 Intelligent Miner for Data", http://www.–4.ibm.com/software/data/iminer/fordata/index.htm, IBM Software: Database and Data Managem . . . B2

Intelligent Miner for Data: Overview, (last modified May 22, 2000).

"Data Mining The Data Mining Challenge: Turning Raw Data Into Business Gold", http://www.sas.com/software/data_mining, SAS Institute's Data Mining Solution, (last modified May 22, 2000).

"Enterprise Miner", http://www.sas.com/software/components/miner.htp, Enterprise Miner, (last modified May 22, 2000).

* cited by examiner

*Primary Examiner*—Kamini Shah
*Assistant Examiner*—Xiuqin Sun
(74) *Attorney, Agent, or Firm*—Scully, Scott, Murphy & Presser; Lawrence R. Fraley, Esq.

(57) ABSTRACT

A method and system for identifying parameters that are important in predicting a target variable. The method comprises the steps of compiling training data, said training data identifying, for each of a first set of subjects, values for each of a first set of parameters; and compiling test data, said test data identifying, for each of a second set of subjects, values for each of a second set of parameters, said first and second sets of parameters having at least a plurality of common parameters. The method comprises the further steps of using the data in the training data, and using a nearest neighbor procedure, to identify, for each of the second set of subjects, a value for a target parameter; and processing the training data and the test data, according to a predefined procedure, to determine the relative importance of at least selected ones of the first group of parameters in predicting the values for the target parameter.

9 Claims, 4 Drawing Sheets

A method of identifying parameters that are important in predicting a target variable.

> compiling training data, said training data identifying, for each of a first set of subjects, values for each of a first set of parameters > compiling test data, said test data identifying, for each of a second set of subjects, values for each of a second set of parameters, said first and second sets of parameters having at least a plurality of common parameters > using the data in the training data, and using a nearest neighbor procedure, to identify, for each of the second set of subjects, a value for a target parameter > processing in the training data and the test data, according to a predefined procedure, to determine the relative importance of at least selected ones of the first group of parameters in predicting the values for the target parameter

FIG. 1

Training Data: We assume that we are given a table (or matrix) of data D of size (N x P), with each row corresponding to an observation and each column corresponding to a measurement. The columns of D correspond to the predictor variables. We also assume that we have a target vector T of size (N x 1). Without loss of generality, we assume that T is a binary vector.

Test Data: We assume that we are given a matrix E of size (M x P) which contains measurements from the same sources as the matrix D.

Predict the unknown targets U (M x 1) vector associated with the matrix E. Also, for each prediction, determine which predictors are important in the prediction.

Predictor Importance

101 — Set j = 1, which corresponds to the jth row index of the matrix E.

102 — Set the number of nearest neighbors = K.

103 — For the jth row of matrix E, E(j), compute the K nearest neighbors using the standard Euclidean measure.

104 — Let Q = the K rows of the matrix D that correspond to the nearest neighbors of E(j).

105 — Compute a matrix R such that $R(a,b) = (E(j,b) - Q(a,b))^2$ for a = 1...K, b = 1...P. The matrix R will be of size K x P.

106 — For each column in the matrix R, we compute the means and standard deviations of the column.

107 — Now, for the ath column of R, we eliminate values of R that lie outside a W standard deviation bound from the mean, where W is chosen by the user. Usually, W lies between 2 and 6.

108 — The most important variables are a subset of the P variables where the distances in R are below the mean - (W/2) * standard deviation.

109 — Repeat until j = N.

FIG. 2B

Column Ranking {1, 4, 2, 3, 5, 7, 8, 6}

METHOD AND SYSTEM TO IDENTIFY WHICH PREDICTORS ARE IMPORTANT FOR MAKING A FORECAST WITH A COLLABORATIVE FILTER

BACKGROUND OF THE INVENTION

1. Field of the Invention

This invention generally relates to forecasting; and, more specifically, the invention relates to methods and systems to identify which predictors are important for making particular forecasts. The preferred embodiment of the invention may be used in any area where the collaborative filter (also called nearest neighbor) data mining technology is applied. Such areas include, but are not limited to, e-commerce, banking, manufacturing, securities trading, website personalization, mass marketing, communications, and medical diagnosis.

2. Prior art

The collaborative filter, also called the nearest neighbor model, is a mathematical model that is used to predict the value of a target variable given a set of input variables. For example, consider a scenario where a researcher has collected data regarding a population's age, height, weight, and gender. This information is contained in the following table:

TABLE 1

Sample data containing a population's age, height, weight, and gender information.

|  | Age (years) | Height (inches) | Weight (lbs) | Gender |
|---|---|---|---|---|
| Subject 1 | 53 | 65 | 165 | M |
| Subject 2 | 44 | 54 | 150 | M |
| Subject 3 | 32 | 74 | 175 | F |
| Subject 4 | 12 | 50 | 120 | M |
| Subject 5 | 9 | 36 | 90 | F |

In this hypothetical example, suppose that the task is to take age, height, and weight information from a new table of data and use that information to determine the gender of the individual. Thus, suppose we are given a table as follows:

TABLE 2

Sample data containing age, height, and weight information for five new subjects. Gender is unknown.

|  | Age (years) | Height (inches) | Weight (lbs) | Gender |
|---|---|---|---|---|
| Subject 6 | 13 | 51 | 121 | ? |
| Subject 7 | 29 | 74 | 175 | ? |
| Subject 8 | 50 | 70 | 170 | ? |
| Subject 9 | 5 | 30 | 30 | ? |
| Subject 10 | 10 | 36 | 90 | ? |

The task is to apply the nearest neighbor algorithm to determine the gender of the subjects 6–10 based on the data in Tables 1 and 2.

In a simple implementation of the nearest neighbor algorithm, we compute the Euclidean distance between every subject in our test set (Table 2) and every subject in the training set (Table 1). The gender associated with the nearest match in Table 1 is assigned to the subjects in the test set. A variation on this algorithm is to use the average value of the K nearest neighbors. In this case, we take K=1. Thus:

TABLE 3

Intersubject Euclidean distances. Cells in bold correspond to the nearest neighbor.

|  | Subject 1 | Subject 2 | Subject 3 | Subject 4 | Subject 5 |
|---|---|---|---|---|---|
| Subject 6 | 1244.0 | 603.7 | 1268.7 | 1.0 | 400.7 |
| Subject 7 | 252.3 | 416.7 | 3.0 | 1296.7 | 3023.0 |
| Subject 8 | 19.7 | 230.7 | 121.7 | 1448.0 | 3079.0 |
| Subject 9 | 7251.3 | 5499.0 | 7896.7 | 2849.7 | 1217.3 |
| Subject 10 | 2771.7 | 1693.3 | 3051.0 | 366.7 | 0.3 |

The lowest value in each row indicates the nearest match between the subject in the test set and the subjects in the training set. Thus, Subject 6 is closest to Subject 4. The gender for Subject 6 is thus predicted to be male. Now, we can complete Table 2:

TABLE 4

Subjects in Table 2 with Gender predictions.

|  | Age (years) | Height (inches) | Weight (lbs) | Gender |
|---|---|---|---|---|
| Subject 6 | 13 | 51 | 121 | M |
| Subject 7 | 29 | 74 | 175 | F |
| Subject 8 | 50 | 70 | 170 | M |
| Subject 9 | 5 | 30 | 30 | F |
| Subject 10 | 10 | 36 | 90 | F |

A problem that arises in using this popular algorithm is that it is not known which variables led to the predictions made. For example, for subject 9, all we know at this point is that the nearest neighbor was subject 5. We do not know whether it was the age, height or weight of the subject that led to the conclusion that the subject's gender is female. At this point, the best we can say is that the ensemble of predictors (age, height and weight) led to this conclusion.

SUMMARY OF THE INVENTION

An object of this invention is to provide a novel method and system to identify which predictors are important for making a forecast.

Another object of the present invention is to determine which predictor, if any, are driving a particular predictor in a collaborative filter.

These and other objectives are attained with a method and system for identifying parameters that are important in predicting a target variable. The method comprises the steps of compiling training data, said training data identifying, for each of a first set of subjects, values for each of a first set of parameters; and compiling test data, said test data identifying, for each of a second set of subjects, values for each of a second set of parameters, said first and second sets of parameters having at least a plurality of common parameters.

The method comprises the further steps of using the data in the training data, and using a nearest neighbor procedure, to identify, for each of the second set of subjects, a value for a target parameter; and processing the training data and the test data, according to a predefined procedure, to determine the relative importance of at least selected ones of the first group of parameters in predicting the values for the target parameter.

Further benefits and advantages of the invention will become apparent from a consideration of the following

BRIEF DESCRIPTION OF THE DRAWINGS

FIG. 1 generally outlines a preferred procedure embodying the invention.

FIGS. 2A and 2B describes more specifically a preferred procedure embodying the present invention.

DETAILED DESCRIPTION OF THE PREFERRED EMBODIMENTS

Figure 3:
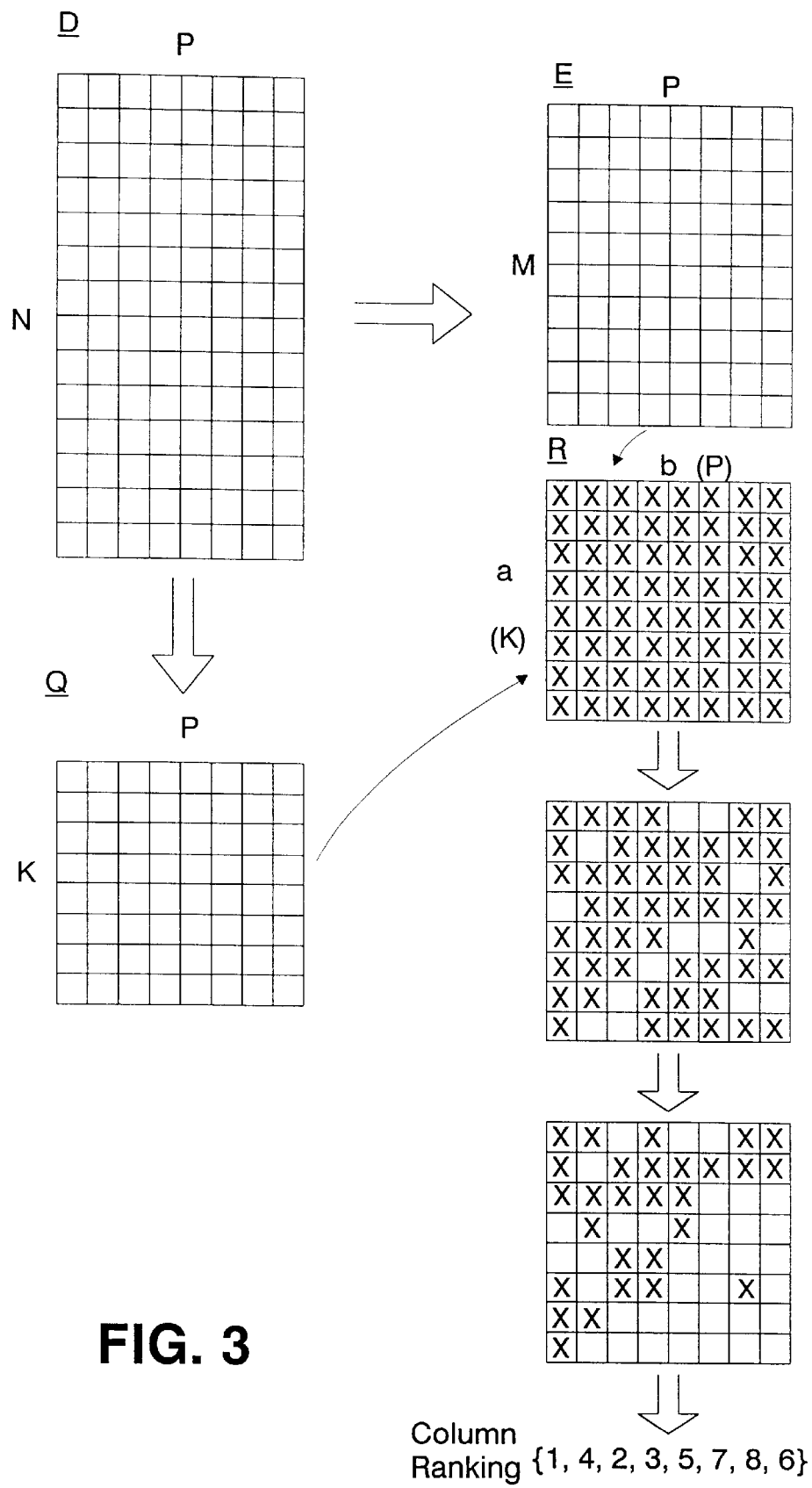
FIG. 3 diagrammatically represents a procedure embodying the invention.

The present invention is a method and system to identify which predictors are important for making a forecast. Generally, in accordance with the invention, training data is compiled for a first set of subjects, test data is compiled for a second set of subjects, and the training data is used to identify target values for the second set of subjects. Also, the training data and the test data are processed to determine the relative importance of at least selected parameters in predicting the target values.

More specifically, with reference to FIG. 1, the training data identifies, for each of a first set of subjects, values for each of a first group of parameters. The test data identifies, for each of a second set of subjects, values for a second group of parameters. These first and second groups of parameters have at least a plurality of common parameters; however, the test data do not include values for at least one parameter that is in the first group of parameters. The training data is used, employing a nearest neighbor procedure, to identify, for each of the second set of subjects, a value for that one parameter for which the test data do not have values. This one parameter is referred to as the target parameter, and the values for this parameter are the target values.

With reference to FIGS. 2A, 2B and 3, the training data may be given in a table (or matrix) of data D of size (N×P), with each row corresponding to an observation and each column corresponding to a measurement. The columns of D correspond to the predictor variables. Also, a vector T of size (N×1) may be provided or used. Without the loss of generality, it may be noted, T may be a binary vector. The test data may be given in a matrix E of size (M×P), which contains measurements from the same sources as the matrix D.

A first problem is to predict the unknown targets U(M×1) vector associated with the matrix E. Procedures for solving this problem are known in the prior art, as discussed above. A second problem is, for each prediction, to determine which predictors are important in the prediction. The present invention provides a solution for this second problem.

At step 101, a value, j, is set equal to 1, which corresponds to the jth row of the matrix e. In step 102, the value K is set equal to the number of nearest neighbors used in the next neighbor algorithm to determine the target values. As will be understood by those of ordinary skill in the art, a wide range of values may be used for K. In order to improve the statistical significance of the procedure, K is preferably greater than about ten, and more preferably greater than 15. K may, however, have a value in the hundreds or even thousands.

At step 103, the nearest K neighbors, in matrix D, of the jth row of matrix E are identified. Any suitable nearest neighbor procedure, such as standard Euclidean measures, may be employed to do this. At step 104, a matrix Q (or Q(K,P)), is established. Q consists of K row or rows (depending on whether K is 1 or greater than 1, respectively). In particular, Q is the entire row or rows of the matrix D that is or are the nearest neighbor or neighbors of the jth row of matrix E.

At step 105, a matrix R (or R(a,b)) is calculated using the values from the E and Q matrices. Specifically, R is calculated according to the formula:

$$R(a,b)=(E(j,b)-Q(a,b))^2 \text{ for } a=1,\ldots,K \text{ and } B=1,\ldots P.$$

The matrix R will be of the size K×P.

At step 106, for each column in the matrix R, we compute the mean and standard deviations of the column. Then at step 107, for each column of R, we eliminate values of R that lie outside certain bounds. For instance, we may eliminate values of R that lie outside a W standard deviation bound from the mean, where W is chosen by the user. As an example, W may lie between two and six. Next, as represented by step 108, additional relatively large values may be eliminated from R. For instance, for each column of R, a mean of the remaining values of R may be calculated, and only those values kept that are below the mean—(W/2)* standard deviation. Next, the columns of R are ranked in decreasing order of the number (not the value) of the values remaining in each column.

Then the column of matrix D that corresponds to the column of R that has the greatest number of remaining values is identified. The correspondence between the columns of matrix R and the columns of matrix D is based on the column number. For example, the first column of matrix r corresponds to the first column of matrix D, the fifth column of matrix R corresponds to the fifth column of matrix D, and so forth. The parameter of the identified column of D is the most important predictor in forecasting the target value for the row j of matrix E.

Analogously, the parameter of the column of matrix D that corresponds to the column of matrix R that has the second largest number of remaining values, is the second most important predictor in forecasting the target value for the row J of matrix E, the parameter of the column of matrix D that corresponds to the column of matrix R that has the third largest number of remaining values, is the third most important predictor in forecasting the target value for the for j of matrix E, and so forth.

The above procedure may be repeated for each row j of matrix E, as represented by step 109.

The present invention has a wide variety of uses in various industries, including, for example, banking, finance, securities, and e-commerce. One very important use for this invention is in the e-commerce industry, since collaborative filters are extensively used for personalizing web-sites. An exemplary application of this technology to e-commerce follows.

For instance, a web-site may be constructed where consumer demographic data is gathered through a registration process, and consumer purchase behavior is recorded. In such a case, it may be desirable for the web-site to suggest automatically potential cross-sells to the customers. For example, if a consumer registers and divulges age, gender, income level, etc., and the consumer's purchases are recorded, then a collaborative filter could be applied to recommend that the consumer buy another product. The collaborative filter predicts which item is most likely to be of interest to the consumer based on demographics and purchase information.

In this example, without the technology disclosed herein, the collaborative filter would just recommend a product, but could not give a reason why the consumer should make the purchase. The present invention may be used to give reasons why the consumer should make the purchase. In particular, those reasons are the parameter or parameters identified, using the method and system disclosed herein, as the most important predictor or predictors in forecasting the product the consumer should purchase.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of identifying parameters that are important in predicting a target variable, the method comprising the steps of:
    compiling training data, said training data identifying, for each of a first set of subjects, values for each of a first set of parameters;
    compiling test data, said test data identifying, for each of a second set of subjects, values for each of a second set of parameters, said first and second sets of parameters having at least a plurality of common parameters;
    using the data in the training data, and using a nearest neighbor procedure, to identify, for each of the second set of subjects, a value for a target parameter, and
    processing the training data and the test data, according to a predefined procedure, to determine the relative importance of at least selected ones of the first group of parameters in predicting the values for the target parameter.

2. A method according to claim 1, wherein:
    the step of using the data in the training data to identify a value for a target parameter includes the step of, for each subject in the second set of subjects, identifying a subset of the first set of subjects as nearest neighbors; and
    the processing step includes the steps of
        i) for each subject in the second set of subjects, and for each of the parameters common to the first and second set of parameters, calculating values representing differences between the parameter in the second set of parameters and the common parameter in said subset of the first set of subjects,
        ii) discarding selected ones of the calculated values, and
        iii) using the non-discarded ones of the calculated values to identify the relative importance of the common parameters.

3. A method according to claim 1, wherein:
    the step of compiling training data includes the step of forming a first table having the training data arranged in N rows and P columns;
    the step of compiling test data includes the step of forming a second table having the training data arranged in M rows and P columns; and
    the processing step includes the steps of
        i) forming a matrix of values, each of the values in the matrix representing a difference between one of the values in one of the rows of the second table and a corresponding values in the first table, and
        ii) using said differences to determine the relative importance of selected ones of the first group of parameters in predicting the values for the target parameters.

4. A system for identifying parameters that are important in predicting a target variable, the system comprising:
    means for compiling training data, said training data identifying, for each of a first set of subjects, values for each of a first set of parameters;
    means for compiling test data, said test data identifying, for each of a second set of subjects, values for each of a second set of parameters, said first and second sets of parameters having at least a plurality of common parameters;
    means for using the data in the training data, and using a nearest neighbor procedure, to identify, for each of the second set of subjects, a value for a target parameter; and
    means for processing the training data and the test data, according to a predefined procedure, to determine the relative importance of at least selected ones of the first group of parameters in predicting the values for the target parameter.

5. A system according to claim 4, wherein:
    the means for using the data in the training data to identify a value for a target parameter includes the step of, for each subject in the second set of subjects, identifying a subset of the first set of subjects as nearest neighbors; and
    the processing means includes
        i) means for calculating, for each subject in the second set of subjects, and for each of the parameters common to the first and second set of parameters, values representing differences between the parameter in the second set of parameters and the common parameter in said subset of the first set of subjects,
        ii) means for discarding selected ones of the calculated values, and
        iii) means for using the non-discarded ones of the calculated values to identify the relative importance of the common parameters.

6. A system according to claim 4, wherein:
    the means for compiling training data includes means for forming a first table having the training data arranged in N rows and P columns;
    the means for compiling test data includes means for forming a second table having the training data arranged in M rows and P columns; and
    the processing means includes
        i) means for forming a matrix of values, each of the values in the matrix representing a difference between one of the values in one of the rows of the second table and a corresponding values in the first table, and
        ii) means for using said differences to determine the relative importance of selected ones of the first group of parameters in predicting the values for the target parameters.

7. A program storage device readable by machine, tangibly embodying a program of instructions executable by the machine to perform method steps for identifying parameters that are important in predicting a target variable, the method steps comprising:
    compiling training data, said training data identifying, for each of a first set of subjects, values for each of a first set of parameters;
    compiling test data, said test data identifying, for each of a second set of subjects, values for each of a second set of parameters, said first and second sets of parameters having at least a plurality of common parameters;

using the data in the training data, and using a nearest neighbor procedure, to identify, for each of the second set of subjects, a value for a target parameter; and processing the training data and the test data, according to a predefined procedure, to determine the relative importance of at least selected ones of the first group of parameters in predicting the values for the target parameter.

8. A program storage device according to claim 7, wherein:

the step of using the data in the training data to identify a value for a target parameter includes the step of, for each subject in the second set of subjects, identifying a subset of the first set of subjects as nearest neighbors; and the processing step includes the steps of
  i) for each subject in the second set of subjects, and for each of the parameters common to the first and second set of parameters, calculating values representing differences between the parameter in the second set of parameters and the common parameter in said subset of the first set of subjects,
  ii) discarding selected ones of the calculated values, and
  iii) using the non-discarded ones of the calculated values to identify the relative importance of the common parameters.

9. A program storage device according to claim 7, wherein:

the step of compiling training data includes the step of forming a first table having the training data arranged in N rows and P columns;

the step of compiling test data includes the step of forming a second table having the training data arranged in M rows and P columns; and the processing step includes the steps of
  i) forming a matrix of values, each of the values in the matrix representing a difference between one of the values in one of the rows of the second table and a corresponding values in the first table, and
  ii) using said differences to determine the relative importance of selected ones of the first group of parameters in predicting the values for the target parameters.

* * * * *